US007424038B2

(12) United States Patent
Yang

(10) Patent No.: US 7,424,038 B2
(45) Date of Patent: Sep. 9, 2008

(54) METHOD AND APPARATUS FOR STORING/REPRODUCING TRANSPORT STREAM, AND DIGITAL RECEIVER USING THE SAME

(75) Inventor: Yoon Seok Yang, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 593 days.

(21) Appl. No.: 11/029,506

(22) Filed: Jan. 6, 2005

(65) Prior Publication Data

US 2005/0152405 A1 Jul. 14, 2005

(30) Foreign Application Priority Data

Jan. 9, 2004 (KR) ...................... 10-2004-0001458

(51) Int. Cl.
*H04J 3/24* (2006.01)
*H04J 3/04* (2006.01)

(52) U.S. Cl. ...................................... 370/474; 370/535

(58) Field of Classification Search ....................... None
See application file for complete search history.

(56) References Cited

U.S. PATENT DOCUMENTS 6,021,168 A * 2/2000 Huh ........................... 375/376
6,236,432 B1 * 5/2001 Lee ........................ 375/240.26
6,453,295 B1 * 9/2002 Mihara et al. ............... 704/500
6,584,120 B1 * 6/2003 Shiomoto et al. ........... 370/473
6,873,629 B2 * 3/2005 Morris ........................ 370/535
6,963,673 B1 * 11/2005 Patel et al. .................. 382/239
2002/0181600 A1 * 12/2002 Matsuura et al. ....... 375/240.27
2003/0182662 A1 * 9/2003 Nishio et al. .................. 725/95
2004/0109519 A1 * 6/2004 Mizukami et al. ........... 375/362

* cited by examiner

*Primary Examiner*—Andrew Lee
(74) *Attorney, Agent, or Firm*—Birch, Stewart, Kolasch & Birch, LLP

(57) ABSTRACT

A method and apparatus for storing/reproducing a transport stream and a digital receiver using the same are disclosed. The method for storing the transport stream includes the steps of receiving a TS, selecting a storing stream type for the TS, and transcoding the TS into a PES or PS according to the selected stream type and storing the transcoded stream, or storing the TS as it is. Accordingly, the structure for storing the PS or TS overcomes incompatibility of the stored stream and difficulty in the rate control at the time of reproduction in the general PVR.

7 Claims, 8 Drawing Sheets

METHOD AND APPARATUS FOR STORING/REPRODUCING TRANSPORT STREAM, AND DIGITAL RECEIVER USING THE SAME

This application claims the benefit of the Korean Patent Application No. 10-2004-0001458, filed on Jan. 9, 2004, which is hereby incorporated by reference as if fully set forth herein.

BACKGROUND OF THE INVENTION

1. Field of the Invention

The present invention relates to a digital receiver, and more particularly, to a method and apparatus for efficiently storing/reproducing a transport stream, and a digital multimedia broadcast (DMB) receiver using the same.

2. Background of the Related Art

A broadcasting digitalization tendency has been accelerated through existing media such as ground wave, satellite and cable TV broadcasting, and progressively changed an environment of a broadcasting industry. Among the various media, a new medium representing harmony of broadcasting digitalization and communication is a DMB service.

If the DMB service is used in a full scale, it is expected that technologies applied to a general ground wave or satellite broadcasting receiver will be applied to a DMB receiver. It is also expected that new technologies suitable for mobility will be rapidly developed and used.

One of the technologies applied to the general ground wave or satellite broadcasting receiver and expected to be applied to the DMB receiver is a personal video recorder (PVR) function.

FIG. 1 illustrates a structure of a general PVR embodied in a DMB receiver.

Referring to FIG. 1, the general PVR stores a packetized elementary stream (PES) obtained by demultiplexing an MPEG-2 transport stream (TS) in a hard disk drive (HDD) 2 that is a storing medium.

Here, necessary time synchronization information is stored with the stream in the form of additional information according to methods suitable for each local environment (for example, countries, companies, etc.)

When the stored stream is reproduced, the stream is read with the stored time information, or controlled to a storing rate at the time of transmission and displayed by using a request signal of an audio/video decoder 1.

Therefore, in order to store the stream, the general PVR stores the additional time information for the rate control or requires the request signal.

However, the stream stored in the storing medium does not have compatibility with other PVR receivers, and the local time information must be individually stored.

Such disadvantages cause serious problems to the DMB receiver characterized by mobile reception.

SUMMARY OF THE INVENTION

Accordingly, the present invention is directed to a method and apparatus for storing/reproducing a transport stream, and a DMB receiver using the same that substantially obviate one or more problems due to limitations and disadvantages of the related art.

An object of the present invention is to provide a method for storing a PS that is improved from a general PVR method.

Another object of the present invention is to provide a variable structure which can select methods for storing a PES, a PS and a TS according to advantages in embodiment of a PVR system.

Yet another object of the present invention is to provide a structure for embodying a PVR in a DMB receiver.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for storing a transport stream includes the steps of: receiving a TS; selecting a storing stream type for the TS; and transcoding the TS into a PES or PS according to the selected stream type and storing the transcoded stream, or storing the TS as it is.

The method for storing the PES transcodes the TS into the PES by demultiplexing, and stores the transcoded stream.

The method for storing the PS includes the steps of: transcoding the TS into a PES signal by demultiplexing; and transcoding the transcoded PES signal into a PS signal by multiplexing.

The PS transcoding step includes a step for generating an SCR value by using a local clock and a PCR value of the stream.

Preferably, when the TS is stored as the PES or PS, PSI information is also stored.

In another aspect of the present invention, a method for reproducing a transport stream includes the steps of: reading a stream stored in a storing medium; deciding a type of the read stream; and transcoding the stream into a PES according to the decided stream type, and decoding the transcoded stream.

When the stored stream is a PS, the PS is transcoded into a PES by demultiplexing.

When the stored stream is a TS, the TS is transcoded into a PES by demultiplexing.

In yet another aspect of the present invention, an apparatus for storing a transport stream includes: a DEMUX for receiving a TS, demultiplexing the TS into a PES, and outputting the PES; a PS MUX for receiving the outputted PES, and transcoding the PES into a PS; and a storing medium for storing any one type of stream selected from the PES, PS and TS.

In yet another aspect of the present invention, an apparatus for reproducing a transport stream includes: a storing medium for storing a PES, PS or TS; a DEMUX for transcoding the PS and TS of the stored streams into the PES by demultiplexing; and a decoder for decoding and outputting the stored PES or the demultiplexed stream.

In yet another aspect of the present invention, a digital receiver includes: a PID filter for filtering and outputting a TS by programs; a TS DEMUX for demultiplexing the TS from the PID filter into a PES signal; a PS MUX for transcoding the PES into a PS; a download controller for receiving the TS, PES and PS from each block, and storing the received streams in a storing medium in any one of types; an upload controller for reading the stream stored as the TS, PES or PS; and a decoder for receiving the PES from the upload controller or the TS DEMUX, decoding the received stream, and outputting an audio/video signal.

The digital receiver further includes a PS DEMUX for transcoding the PS stored in the storing medium into the PES.

When the type of the stream stored in the storing medium is the TS, the TS is inputted to the PID filter through the upload controller.

In accordance with the present invention, the structure and method for storing the PS or TS are suggested to overcome incompatibility of the stored stream and difficulty in the rate control at the time of reproduction in the general PVR.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The present inventors mostly select the publicly-known terms to describe the present invention, but also use the terms that the present inventors deem most appropriate to describe new technologies. The meanings of such terms are clearly explained in the corresponding parts. Therefore, it is recognized that the present invention must not be understood by the names of the terms but by the meanings of the terms.

Figure 1:
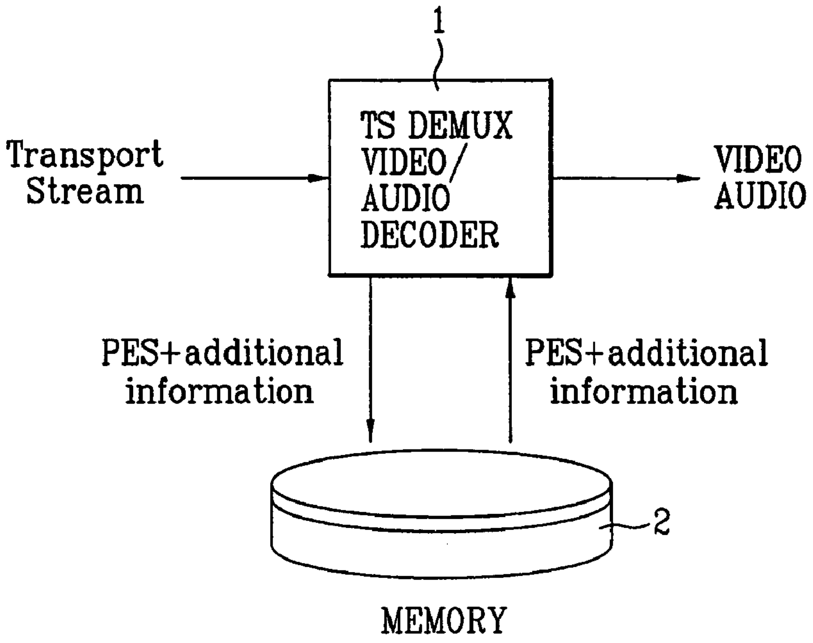
FIG. 1 Related Art
FIG. 1 illustrates a structure of a general PVR in a DMB receiver.
Figure 2:
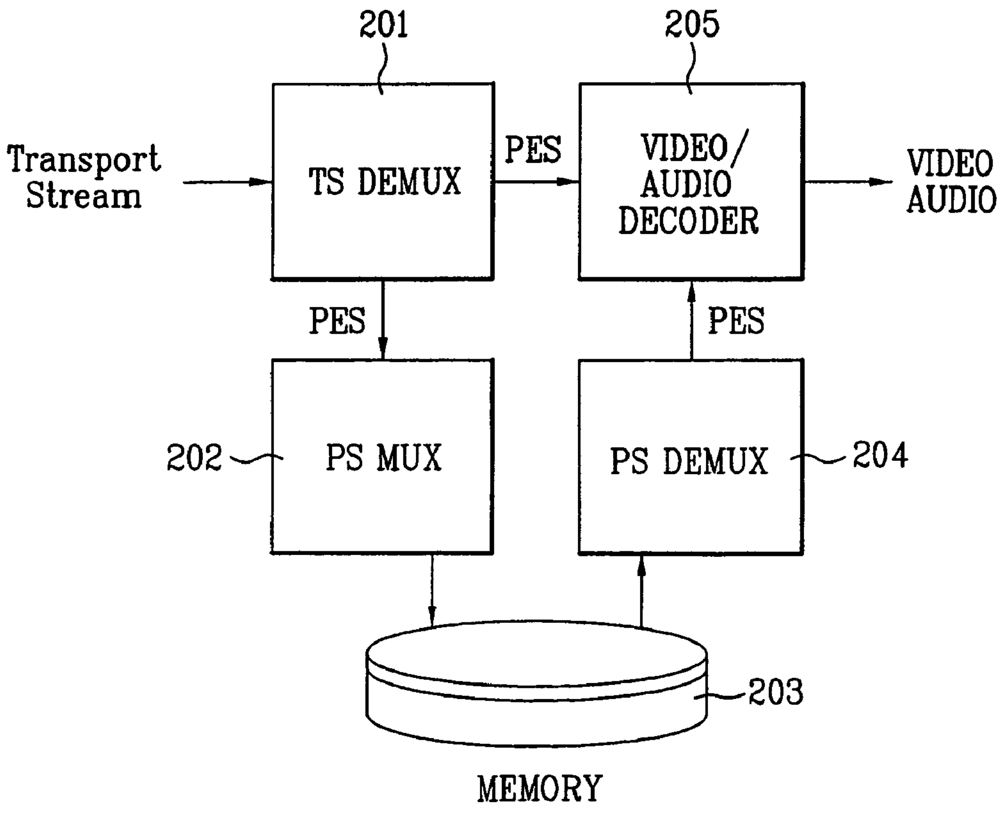
FIG. 2 illustrates a structure of a PVR for storing a PS in accordance with the present invention.

FIG. 2 illustrates a structure of a PVR for storing a PS in accordance with the present invention.

As illustrated in FIG. 2, a transport stream (TS) is transcoded into a packetized elementary stream (PES) by a TS DEMUX 201, transcoded into a program stream (PS) by a PS MUX 202, and stored in a storing medium 203 such as a hard disk drive (HDD).

When the PS stored in the storing medium 203 is reproduced, the PS is demultiplexed by a PS DEMUX 204 to be transcoded into the PES, and the PES is decoded by an audio/video decoder 205, and displayed.

In order to solve the problems that occur when the PES is stored, the TS is transcoded into the PS and stored. Since the PS is a packet multiplexing standard for the storing medium, a rate and A/V synchronization can be controlled by using a system clock reference (SCR) value of the stream.

Figure 3:
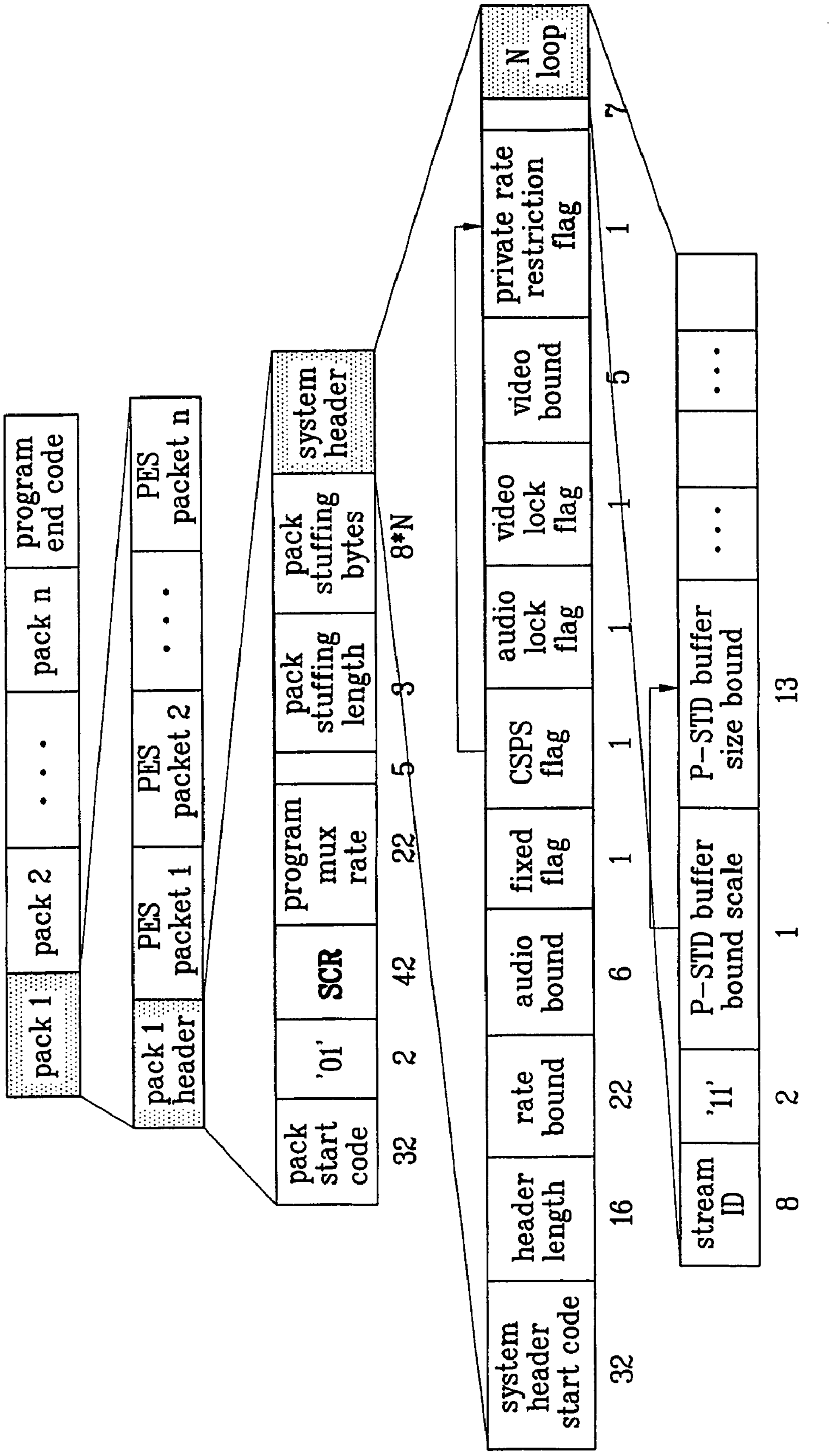
FIG. 3 illustrates a structure of a PS packet in accordance with the present invention.

FIG. 3 illustrates a header structure of the PS packet.

As shown in FIG. 3, the PS includes a few PES packets, and is formed in pack units. Each pack includes a pack header and a payload.

The PES packet has a variable length. Especially, there is no limit to divide the PES packets. Therefore, the pack comprised of the PES packets may not have a PES packet or may have a lot of PES packets. The pack header displays the SCR that is time information of the PS, thereby controlling the rate and A/V synchronization.

Figure 4:
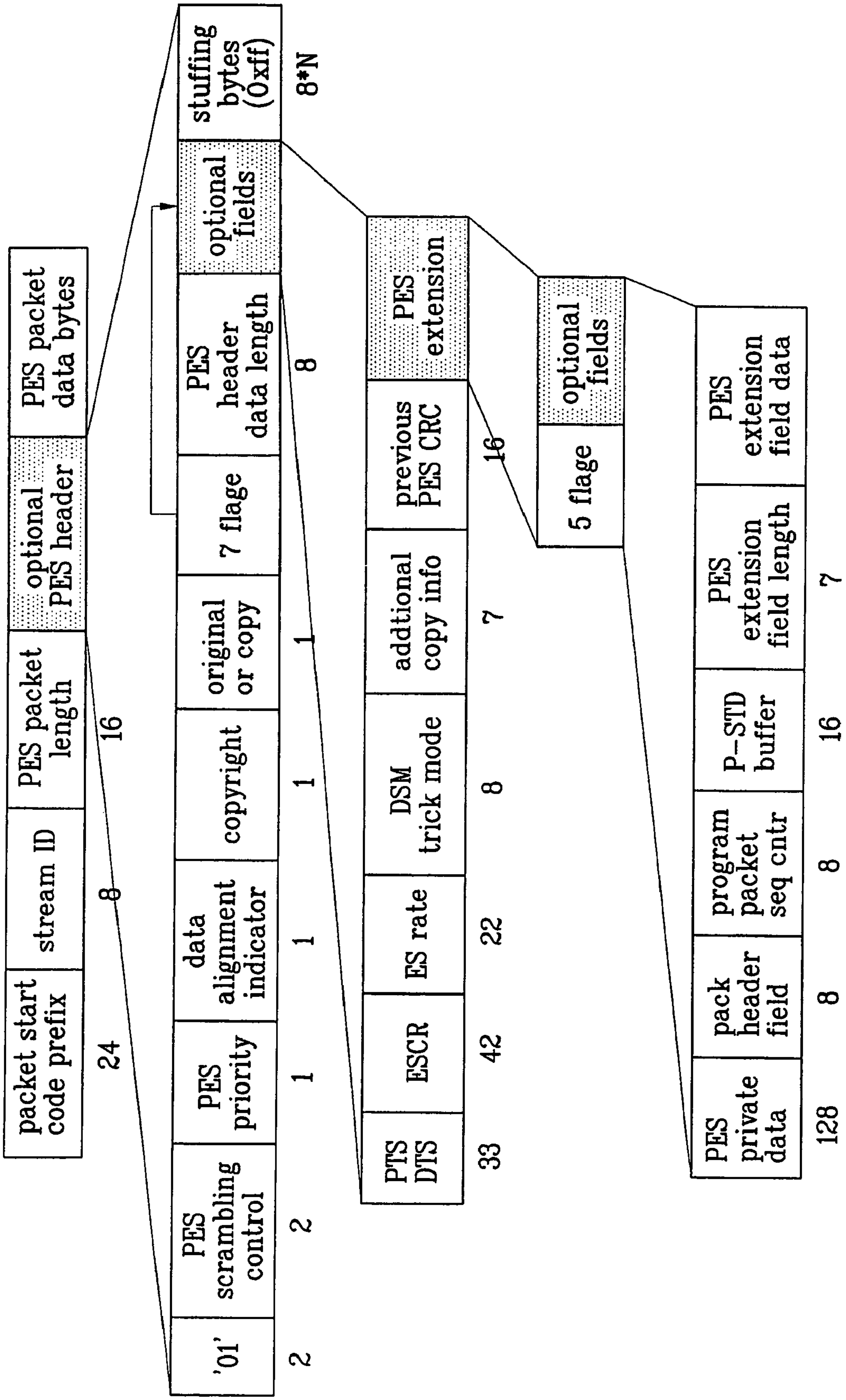
FIG. 4 illustrates a structure of a PES packet in accordance with the present invention.
Figure 5:
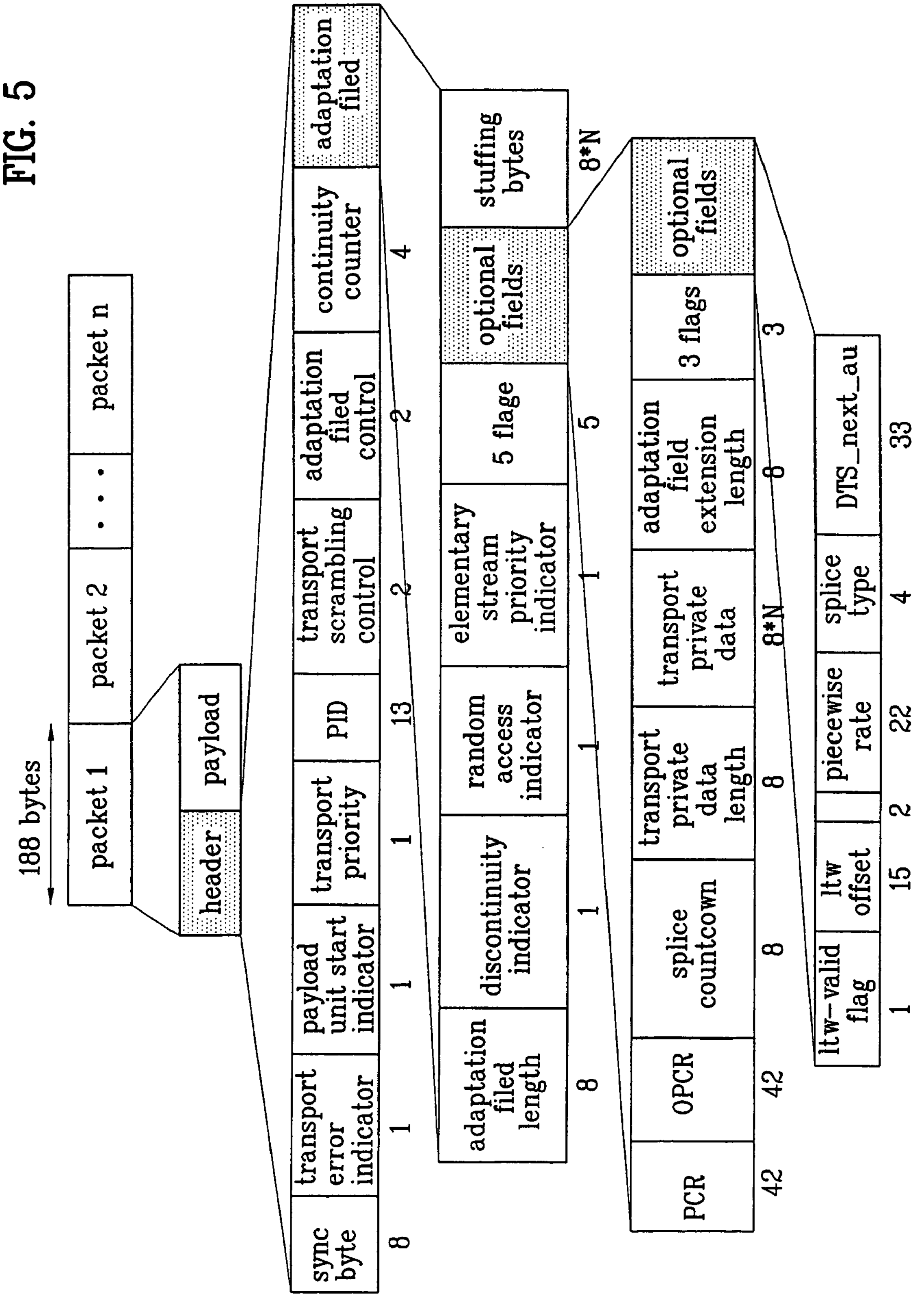
FIG. 5 illustrates a structure of a TS packet in accordance with the present invention.

FIG. 4 illustrates a header structure of the PES packet, and FIG. 5 illustrates a header structure of the TS packet.

The present invention also suggests a method for storing a TS as it is. That is, the TS is stored in the memory as it is without demultiplexing.

Advantages and disadvantages of the methods for storing the PES, PS and TS will now be described.

Differently from the TS, when the PS and the PES are stored, a program specific information (PSI) packet must be individually stored or transmitted. Since the TS have the PSI packet, the PSI packet needs not to be individually stored or transmitted. For reference, the PSI packet is inserted into the payload part of the TS packet, and has information notifying which of the packets needs to be decoded by which of the programs.

When the PES is stored, the TS or PS DEMUX is not required to decode the stored stream. As compared with the TS or PS, the PES reduces data waste.

Figure 6:
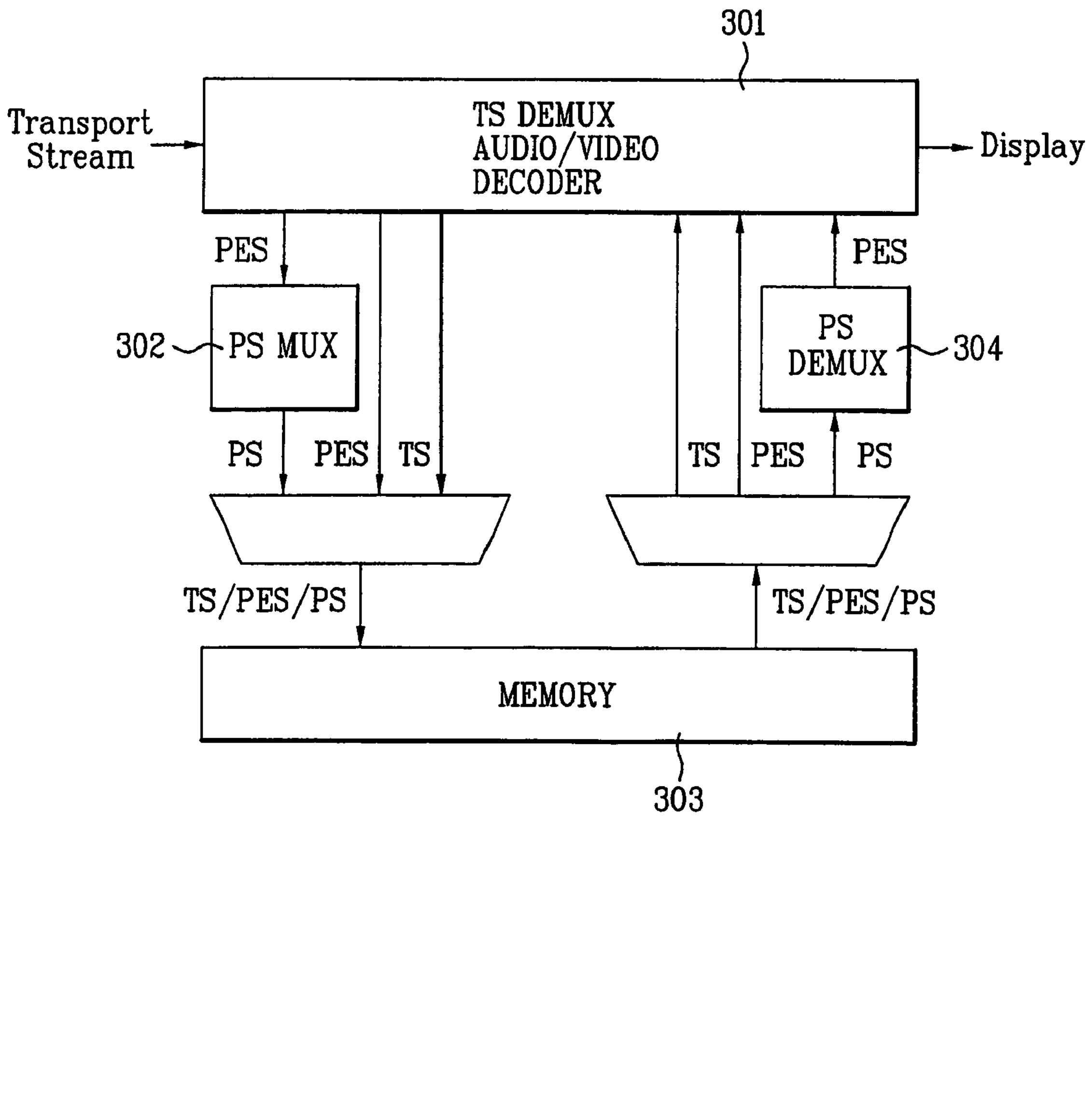
FIG. 6 illustrates a PVR for storing/reproducing a PES, PS or TS in accordance with the present invention.

Because the methods for storing the TS, PES and PS have different advantages and disadvantages, the present invention adopts the PVR structure for selectively taking advantages of each structure as shown in FIG. 6.

FIG. 6 illustrates the PVR for storing/reproducing the PES, PS or TS in accordance with the present invention.

As depicted in FIG. 6, the PVR receives a TS, and a TS DEMUX 301 decides to store the TS as a PS, PES or TS.

In order to store the PS, the TS DEMUX 301 parses the TS, and outputs the PES to a PS MUX 302 to be transcoded into the PS. The PS generated by the PS MUX 302 is stored in a storing medium 303 as it is. An HDD is used as the storing medium 303.

When the stored PS is reproduced, the PS read from the storing medium 303 is transcoded into the PES by a PS DEMUX 304, and the PES is decoded by an audio/video decoder 301 and displayed.

When the PS MUX 302 generates the PS, the PS MUX 302 generates the SCR value by using a local clock and a program clock reference (PCR) value. The generated SCR value is used to control the rate of the PS DEMUX 304 reading the stream, thereby controlling synchronization.

In addition, the TS DEMUX 301 can store the PES or TS without using the PS MUX 302.

Since the PES or PS does not have program guide information, the PES must store the PSI information.

Conversely, since the TS has the PSI packet, such information needs not to be individually managed.

When the PES or TS is reproduced, a buffer state of the audio/video decoder 301 must be checked. Therefore, the reading rate of the stored stream from the storing medium can be controlled to prevent overflow of the buffer.

Figure 7:
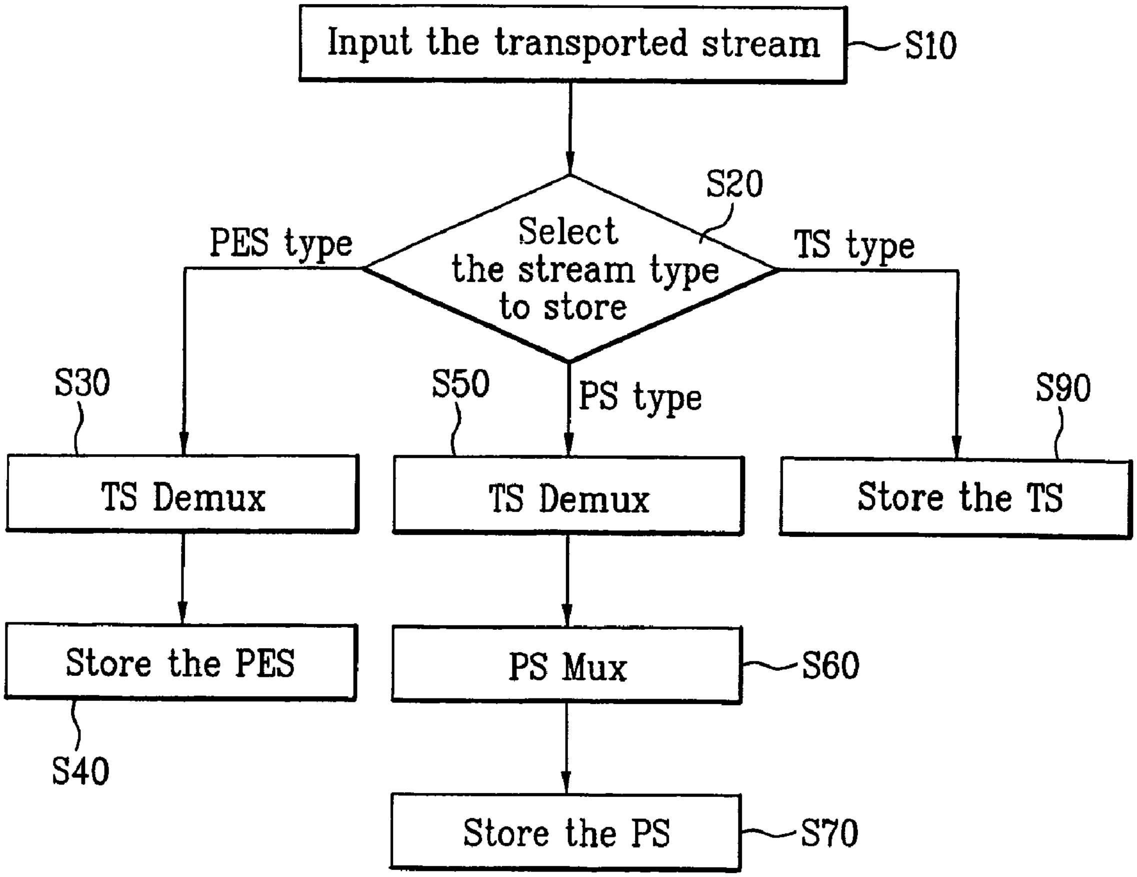
FIGS. 7 and 8 illustrate sequential steps of a method for storing/reproducing a PES, PS or TS in a PVR in accordance with the present invention.
Figure 8:
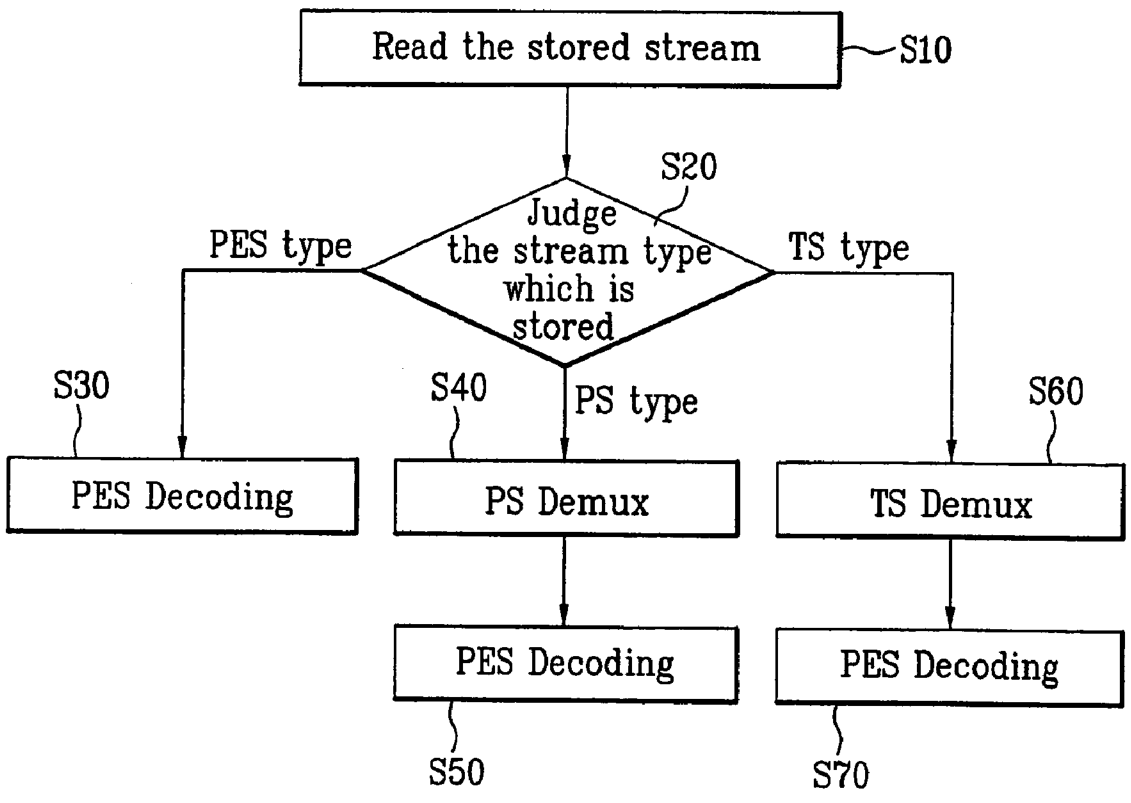

FIGS. 7 and 8 illustrate sequential steps of the method for storing/reproducing the PES, PS or TS in the PVR in accordance with the present invention.

FIG. 7 illustrates sequential steps of the method for storing the stream from the PVR as the PES, PS or TS. As shown in FIG. 7, when the TS is inputted (S10), the stream storing type is selected (S20).

When the selected type is the PES, the TS is transcoded into the PES by demultiplexing (S30). The transcoded PES is stored in the storing medium (S40).

On the other hand, when the selected type is the PS, the TS is transcoded into the PES by demultiplexing (S50). Thereafter, the transcoded PES stream is multiplexed into the PS (S60), and the PS is stored in the storing medium (S70).

When the selected type is the TS, the TS is stored in the storing medium as it is (S80).

FIG. 8 illustrates sequential steps of the method for reproducing the PES, PS or TS stored in the PVR. As illustrated in FIG. 8, the stream stored in the storing medium is read (S10).

The type of the read stream is decided (S20). When the type of the stream is the PES, the PES is decoded and outputted (S30).

When the type of the read stream is the PS, the PS is transcoded into the PES by demultiplexing (S40), and the transcoded PES is decoded and outputted (S50).

When the type of the read stream is the TS, the TS is transcoded into the PES by demultiplexing (S60), and the transcoded PES is decoded and outputted (S70).

Figure 9:
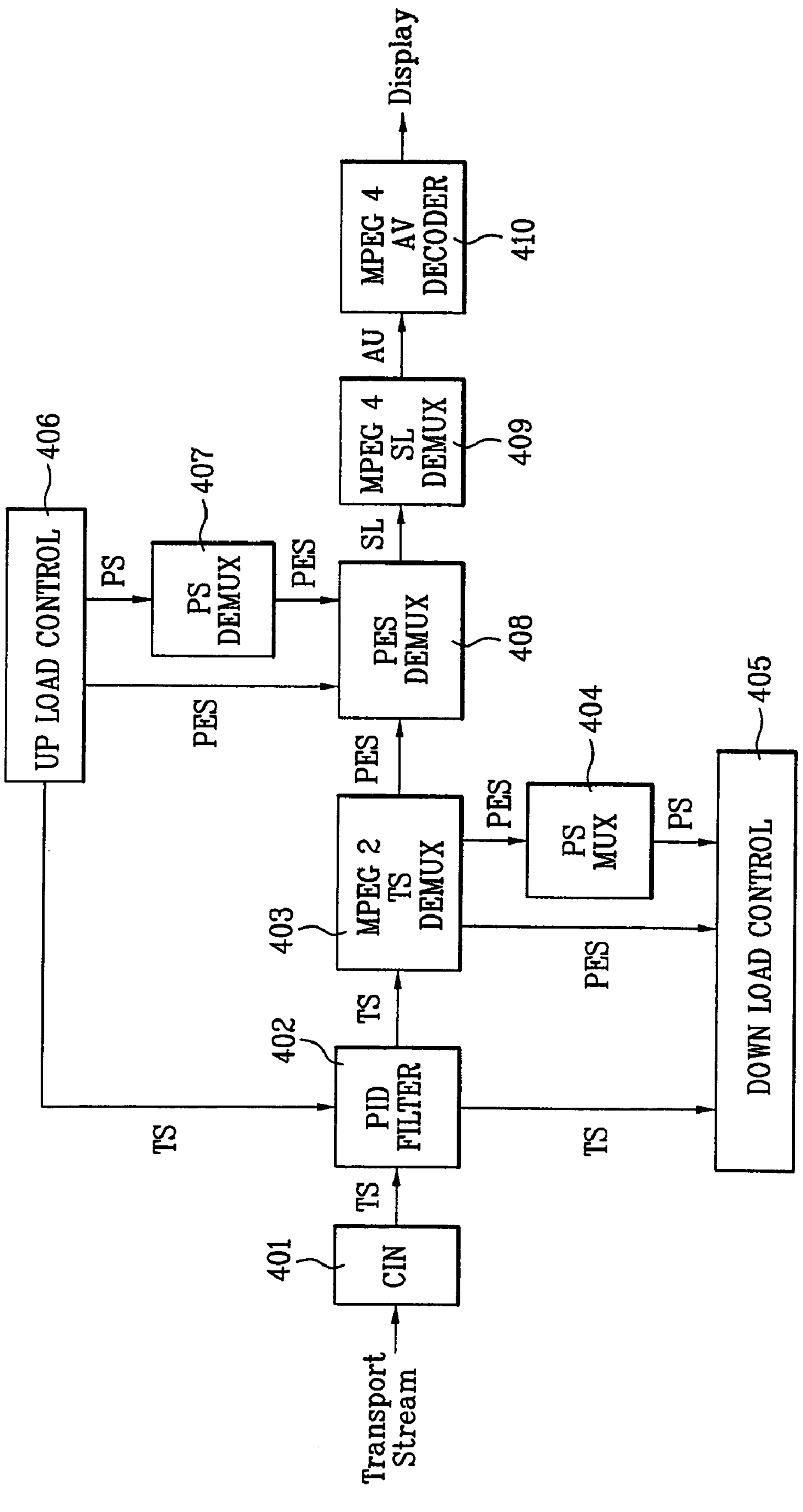
FIG. 9 illustrates one example of applying the PVR structure to a DMB receiver in accordance with the present invention.

FIG. 9 illustrates one example of applying the PVR structure to the DMB receiver in accordance with the present invention.

Referring to FIG. 9, a TS inputted to the DMB receiver is transmitted to a packet identifier (PID) filter 402 through a channel input (CIN) block 401. The PID filter 402 filters the input packet to be decoded or stored by programs.

When the filtered TS is intended to be stored in a storing medium (not shown), the TS is transmitted to a download controller 405, and stored in the storing medium through the download controller 405.

When the filtered TS is decoded, the TS is transmitted to an MPEG-2 TS DEMUX 403. The MPEG-2 TS DEMUX 403 transcodes the TS into a PES by demultiplexing.

The transcoded PES is transmitted to the download controller 405 to be stored, and to a PES DEMUX 408 to be decoded.

When the PES is stored, the PES is stored in the storing medium through the download controller 405 without passing through a PS MUX 404. To store a PS, the transcoded PES is transmitted to the PS MUX 404 and transcoded into the PS. The transcoded PS is stored in the storing medium through the download controller 405.

As described above, in order to reproduce the TS, PES and PS stored in the storing medium, the stored TS is transmitted to the PID filter 402 through an upload controller 406, and transcoded into the PES by the MPEG-2 TS DEMUX 403.

The stored PES is transmitted directly from the upload controller 406 to the PES DEMUX 408, and the PS is demultiplexed by a PS DEMUX 407 to be transcoded into the PES, and inputted to the PES DEMUX 408.

The PES DEMUX 408 receives the PES, and demultiplexes a sync layer (SL) under the MPEG-4 standard. An MPEG-4 SL DEMUX 409 receives the SL and outputs an access unit (AU).

An MPEG-4 AV decoder 410 decodes and outputs audio and video signals by the AU for display.

As discussed earlier, in accordance with the present invention, the method and apparatus for storing/reproducing the TS, and the digital receiver using the same have the following advantages.

First, the structure and method for storing the PS or TS are suggested to overcome incompatibility of the stored stream and difficulty in the rate control at the time of reproduction in the general PVR.

Second, the PVR structure applied to the DMB receiver for storing the PS, TS and PES is suggested to improve competitiveness of the DMB receiver and facilitate development of various application products.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for storing a broadcast signal in a digital receiver including a storage medium, the method comprising the steps of:

receiving a broadcast signal of a transport stream (TS) type;

selecting one of a TS, program stream (PS) and packetized elementary stream (PES) type as a storing type in order to store the broadcast signal in the storage medium;

if the selected storing type is the PES type transcoding the broadcast signal of the TS type into a the broadcast signal of the PES type by demultiplexing and storing the transcoded broadcast signal of the PES type in the storage medium;

if the selected storing type is the PS type, transcoding the broadcast signal of the TS type into the broadcast signal of the PES type by demultiplexing, transcoding the transcoded broadcast signal of the PES type into the broadcast signal of the PS type by multiplexing and storing the transcoded broadcast signal of the PS type in the storage medium: and if the selected storing type is the TS type, storing the broadcast signal of the TS type as it is in the storage medium.

2. The method of claim 1, wherein, when the broadcast signal of the PES or PS type is stored, PSI (program specific information) is also stored in the storage medium.

3. A method for reproducing a broadcast signal in a digital receiver including a storage medium, the method comprising the steps of:

reading a broadcasting signal stored in the storage medium;

deciding a storing type of the read broadcasting signal; and if the decided storing type is a PES type, decoding the broadcast signal of the PES type:

if the decided storing type is a PS type, transcoding the broadcast signal of the PS type into the broadcast signal of the PES type by demultiplexing, and decoding the transcoded broadcast signal of the PES type; and if the decided storing type is a TS type, transcoding the broadcast signal of the TS type into the broadcast signal of PES type by demultiplexing, and decoding the transcoded broadcast broadcast signal of the PES type.

4. A digital receiver for storing a broadcast signal, the digital receiver comprising:

a TS DEMUX for receiving a broadcast signal of a transport stream (TS) type, and outputting the broadcast signal of a PES (packetized elementary stream) type by demultiplexing;

a PS (program stream) MUX for receiving the broadcast signal of the PES type from the TS MUX, and outputting the broadcast signal of a PS type by multiplexing;

a download controller for selecting any one of the TS, PES, and PS type as a storing type;

a storage medium for storing the broadcast signal of any one of the TS, PS, and PES type according to the selected storing type;

an upload controller for reading broadcasting signal stored in the storage medium, and deciding a storage type of the read broadcasting signal;

a PS DEMUX for receiving the broadcast signal of the PS type from the upload controller and outputting the broadcast signal of the PES type by demultiplexing, when the storing type of the read broadcast signal is the PS type;

a PES DEMUX for receiving the broadcast signal of the PES type from any one of the upload controller, TS DEMUX and PS DEMUX, and demultiplexing sync layer under the MPEG-4 standard;

an MPEG-4 SL DEMUX for receiving the demultiplexed broadcast signal and outputting an access unit; and a decoder for decoding the outputted access unit, and outputting an audio/video signal.

5. The digital receiver of claim 4, wherein the storage medium is a hard disk drive (HDD).

6. The digital receiver of claim 4, wherein the upload controller outputs the broadcast signal of the TS type read from the storage medium to the TS DEMUX.

7. The digital receiver of claim 4, wherein, when the stored broadcast signal is read, a buffer state of the decoder is checked to prevent overflow.

* * * * *